US011473415B2

(12) United States Patent
Malone et al.

(10) Patent No.: US 11,473,415 B2
(45) Date of Patent: Oct. 18, 2022

(54) SEPARATION SYSTEM

(71) Applicant: FMC Technologies, Inc., Houston, TX (US)

(72) Inventors: Ryan Malone, Farmington, NM (US); Eric Joseph Rasmussen, Galveston, TX (US); Isabel Chan, Houston, TX (US); Victor van Asperen, Tomball, TX (US); Sander Guido Baaren, Houston, TX (US)

(*) Notice: Subject to any disclaimer, the term of this patent is extended or adjusted under 35 U.S.C. 154(b) by 237 days.

(21) Appl. No.: 16/618,775

(22) PCT Filed: Jun. 23, 2017

(86) PCT No.: PCT/US2017/039144
§ 371 (c)(1),
(2) Date: Dec. 2, 2019

(87) PCT Pub. No.: WO2018/236402
PCT Pub. Date: Dec. 27, 2018

(65) Prior Publication Data
US 2020/0141221 A1 May 7, 2020

(51) Int. Cl.
*E21B 43/34* (2006.01)
*B01D 17/02* (2006.01)
(Continued)

(52) U.S. Cl.
CPC .......... *E21B 43/34* (2013.01); *B01D 17/0211* (2013.01); *B01D 17/0214* (2013.01);
(Continued)

(58) Field of Classification Search
CPC ..... E21B 43/34; B01D 17/00; B01D 17/0214; B01D 17/045; B01D 17/12; B01D 19/00; B01D 19/0042
(Continued)

(56) References Cited

U.S. PATENT DOCUMENTS

| 2,713,919 | A | * | 7/1955 | Walker | ................... | C10G 33/06 |
| | | | | | | 95/253 |
| 2,730,190 | A | * | 1/1956 | Brown | ............... | B01D 17/0205 |
| | | | | | | 95/253 |

(Continued)

OTHER PUBLICATIONS

Morillo, Elizabeth, et al. "Savvy Separator: Underperforming Gas Scrubbers: How to Fix Them and How to Avoid Them", Society of Professional Engineers, Oil and Gas Facilities, vol. 5, Issue 2 (Apr. 2016) (www.spe.org/en/print-article/?art=14).

*Primary Examiner* — Christopher Upton
(74) *Attorney, Agent, or Firm* — Henry C. Query, Jr.

(57) ABSTRACT

A system for separating a multiphase well stream into a solids fraction, a water fraction, an oil fraction and a gas fraction includes a transportable support surface; a solids separator which is mounted on the support surface and is configured to receive the multiphase well stream and separate the well stream into a first heavy fraction primarily comprising the solids fraction and a first light fraction primarily comprising the gas, oil and water fractions; and a multiphase fluid separator which is mounted on the support surface and includes a first separator section and a second separator section which is positioned vertically below and connected directly to the first separator section. The first separator section is configured to receive the first light fraction and separate the first light fraction into a second light fraction primarily comprising the gas fraction and a second heavy fraction primarily comprising the oil and water fractions. The second separator section is configured to receive the second heavy fraction and separate the second heavy fraction into a third light fraction primarily comprising the oil fraction and a third heavy fraction primarily comprising the oil fraction.

27 Claims, 6 Drawing Sheets

(51) Int. Cl.
*B01D 17/04* (2006.01)
*B01D 17/12* (2006.01)
*B01D 21/30* (2006.01)
*B01D 19/00* (2006.01)

(52) U.S. Cl.
CPC .......... *B01D 17/045* (2013.01); *B01D 17/12* (2013.01); *B01D 19/0042* (2013.01); *B01D 21/30* (2013.01); *B01D 2221/04* (2013.01)

(58) Field of Classification Search
USPC .......... 166/267, 75.12; 95/253; 96/183, 184, 96/186
See application file for complete search history.

(56) References Cited

U.S. PATENT DOCUMENTS

| | | | | |
|---|---|---|---|---|
| 3,380,913 | A | * | 4/1968 | Henderson .............. E21B 43/34 |
| | | | | 166/267 |
| RE27,309 | E | * | 3/1972 | Scott ...................... E21B 43/34 |
| | | | | 166/267 |
| 3,704,567 | A | * | 12/1972 | Engel ...................... E21B 43/34 |
| | | | | 96/183 |
| 3,759,324 | A | * | 9/1973 | Mecusker ............... E21B 43/34 |
| | | | | 166/75.12 |
| 4,737,168 | A | * | 4/1988 | Heath .................... E21B 43/34 |
| | | | | 95/253 |
| 5,064,448 | A | * | 11/1991 | Choi ..................... B01D 17/00 |
| | | | | 95/253 |
| 5,242,604 | A | | 9/1993 | Young et al. |
| 6,032,539 | A | | 3/2000 | Liu et al. |
| 9,091,160 | B2 | | 7/2015 | Renick et al. |
| 2002/0162807 | A1 | | 11/2002 | Kulbeth |
| 2011/0040501 | A1 | | 2/2011 | Martin et al. |
| 2011/0139625 | A1 | | 6/2011 | Arntzen et al. |
| 2015/0337639 | A1 | | 11/2015 | Nevison et al. |
| 2016/0177696 | A1 | | 6/2016 | Raglin |

* cited by examiner

SEPARATION SYSTEM

The present disclosure is directed to a separation system for desanding a multiphase well fluid and for separating the well fluid into its separate gas, oil and water fractions.

BACKGROUND OF THE INVENTION

Hydraulic fracturing, or "fracking", is a common technique for enhancing the extraction of oil and gas from a hydrocarbon well. Fracking involves injecting a high pressure fracking fluid into the well bore in order to create fissures in the hydrocarbon formation through which the oil or gas may flow. The fracking fluid usually includes a mixture of water, chemicals and proppant, such as sand. In some well fracking operations, hundreds of thousands of pounds of sand and millions of gallons of water may be used.

After the fracking operation is completed, much of the fracking water and sand are recovered. First, the well bore is drilled out to remove the fracking sand and any plugs which may be present in the well bore. Then, the well is allowed to flow back in order to expel a large part of the fracking water and sand from the formation. During the drillout phase, the well produces mostly fracking sand, along with some fracking water and formation fluids (e.g., gas, oil and brine). During the flowback phase, the well produces a flowback well stream which comprise mostly fracking water and sand, along with some formation fluids. Only after the proportion of formation fluids in the well stream reaches a certain level is the well put into production.

The fracking water and sand which are recovered from the well during the drillout and flowback phases typically must be disposed of in an environmentally friendly manner. One option for doing so is to recycle the fracking water and sand so that they may be re-used in future fracking operations. Recycling the fracking water and sand involves separating the sand from the water and well fluids and then separating the water from the well fluids. The latter step may also include separating the gas from the oil so that these components may be recovered.

Recycling is usually accomplished using individual desanding, separating and pressure and flow control devices which are transported to the well site individually and then assembled into a separation system. Depending on the quality of the water, gas and oil produced by the separation system, further processing of these components may be required in order to meet certain custody transfer conditions, such as: for gas, less than 7 pounds of free water per MMSCF (million standard cubic feet); for water, less than 1% oil; and for oil, less than 1% water.

Also, due to the different proportions of sand, water and well fluids which are produced during the drillout, flowback and production phases, the separation system may need to be reconfigured for each phase. This process may involve disassembling and reconnecting different devices that are specifically sized to handle the different proportions of sand, water and well fluids which are produced at each phase, which is a labor intensive and time consuming process.

SUMMARY OF THE INVENTION

In accordance with the present disclosure, a separation system for separating a multiphase well stream into a solids fraction, a water fraction, an oil fraction and a gas fraction is provided which comprises a transportable support surface; a first solids separator which is mounted on the support surface and is configured to receive the multiphase well stream and separate the well stream into a first heavy fraction primarily comprising the solids fraction and a first light fraction primarily comprising the gas, oil and water fractions; a multiphase fluid separator which is mounted on the support surface and comprises a first separator section and a second separator section which is positioned vertically below and connected directly to the first separator section; wherein the first separator section is configured to receive the first light fraction and separate the first light fraction into a second light fraction primarily comprising the gas fraction and a second heavy fraction primarily comprising the oil and water fractions; and wherein the second separator section is configured to receive the second heavy fraction and separate the second heavy fraction into a third light fraction primarily comprising the oil fraction and a third heavy fraction primarily comprising the water fraction.

In accordance with one aspect of the disclosure, the separation system further comprises a second solids separator which is connected between a source of the well stream and the first solids separator and is configured to separate a proportion of the solids fraction from the well stream.

In accordance with another aspect of the disclosure, the second solids separator is not mounted on the transportable support surface.

In accordance with a further aspect of the disclosure, the gas fraction is discharged from the multiphase fluid separator through a gas line which is connected to the first separator section, and the oil and gas fractions are discharged from the multiphase fluid separator through respective oil and gas lines which are connected to the second separator section.

In accordance with another aspect of the disclosure, the second separator section comprises an oil/water chamber which is configured to receive the second heavy fraction and separate the second heavy fraction into the third light fraction and the third heavy fraction.

In accordance with yet another aspect of the disclosure, the second separator section comprises an oil chamber which located downstream of the oil/water chamber and is configured to receive the third light fraction from the oil/water chamber.

In accordance with a further aspect of the disclosure, the oil line is connected to the oil chamber and the water line is connected to the oil/water chamber.

In accordance with another aspect of the disclosure, the gas line, the oil line and the water line are each connected to a corresponding customer outlet through which the separate gas, oil and water fractions are discharged from the system.

In accordance with yet another aspect of the disclosure, the separation system further comprises a first flow meter which is positioned in the gas line, a second flow meter which is positioned in the oil line and a third flow meter which is positioned in the water line.

In accordance with a further aspect of the disclosure, the gas fraction, the oil fraction and the water fraction are each discharged from the separation system through a corresponding customer outlet, and the separation system is configured such that at least one of the gas fraction, the oil fraction and the water fraction at its corresponding customer outlet meets or exceeds the following custody transfer standards: less than 7 pounds of free water per MMSCF gas, less than 1% water in oil, and less than 1% oil in water.

In accordance with another aspect of the disclosure, the separation system is configured such that each of the gas fraction, the oil fraction and the water fraction at their corresponding customer outlets meets or exceeds the following custody transfer standards: less than 7 pounds of free water per MMSCF gas, less than 1% water in oil, and less than 1% oil in water.

In accordance with yet another aspect of the disclosure, the separation system further comprises a first inlet line through which the well stream is communicated to the solids separator; a second inlet line through which the first light fraction is communicated to the multiphase fluid separator; a first valve which is positioned in the first inlet line; a second valve which is positioned in the second inlet line; a third valve which is positioned in the gas line; a fourth valve which is positioned in the oil line; a fifth valve which is positioned in the water line; and a system controller which is configured to control the position of each of the valves in response to one or more measured system parameters.

In accordance with a further aspect of the disclosure, the measured system parameters include a pressure in the first inlet line, a pressure in the multiphase fluid separator, a top level of the oil fraction in the oil/water chamber, a bottom level the water fraction in the oil/water chamber, a level of an interface between the oil and water fractions in the oil/water chamber, a top level of the oil fraction in the oil chamber, a flow rate of the gas fraction in the gas line, a flow rate of the oil fraction in the oil line and a flow rate of the water fraction in the water line.

In accordance with another aspect of the disclosure, the measured system parameters further include a pressure difference across the solids separator.

In accordance with yet another aspect of the disclosure, the separation system further comprises a choke manifold which is connected between the solids separator and the multiphase fluid separator, and the measured system parameters further include a pressure difference across the choke manifold.

In accordance with a further aspect of the disclosure, the first through fifth valves are electrically actuated valves.

In accordance with another aspect of the disclosure, the first separator section is configured to separate at least a first proportion of the second heavy fraction from the second light fraction by means of gravity.

In accordance with yet another aspect of the disclosure, the first separator section comprises at least one de-misting device which is configured to separate a second proportion of the second heavy fraction from the second light fraction.

In accordance with a further aspect of the disclosure, the separation system also comprises means for conveying the second proportion of the second heavy fraction to the second separator section separately from the first proportion of the second heavy fraction.

In accordance with another aspect of the disclosure, the first separator section comprises an inlet port through which the first light fraction is received, a gas port through which the gas fraction is discharged, and a vane inlet device which is connected to the inlet port vertically below the gas port.

In accordance with yet another aspect of the disclosure, said at least one de-misting device is positioned vertically above the vane inlet device.

In accordance with a further aspect of the disclosure, said at least one de-misting device comprises two demisting devices positioned one over the other.

In accordance with another aspect of the disclosure, the second separator section is configured to separate at least a first proportion of the third heavy fraction from the third light fraction by means of gravity.

In accordance with yet another aspect of the disclosure, the second separator section comprises an oil/water chamber which is configured to receive the second heavy fraction from the first separator section and separate the first proportion of the third heavy fraction from the third light fraction by means of gravity.

In accordance with a further aspect of the disclosure, the oil/water chamber comprises means for coalescing at least one of droplets of the oil fraction in the second heavy fraction and droplets of the water fraction in the second heavy fraction.

In accordance with another aspect of the disclosure, the oil/water chamber comprises a number of perforated distribution baffles positioned upstream of the coalescing means.

In accordance with yet another aspect of the disclosure, the second separator section comprises an oil chamber which located downstream of the oil/water chamber and is configured to receive the third light fraction from the oil/water chamber.

The present disclosure is also directed to a method for separating a multiphase well stream into a solids fraction, a water fraction, an oil fraction and a gas fraction. The method comprises communicating the well stream to a first separation apparatus; in the first separation apparatus, separating the well stream into a first heavy fraction primarily comprising the solids fraction and a first light fraction primarily comprising the gas, oil and water fractions; communicating the first light fraction to a second separation apparatus; in the second separation apparatus, separating the first light fraction into a second light fraction primarily comprising the gas fraction and a second heavy fraction primarily comprising the oil and water fractions, and then separating the second heavy fraction into a third light fraction primarily comprising the oil fraction and a third heavy fraction primarily comprising the water fraction; and discharging the gas, oil and water fractions individually from the second separation apparatus.

In accordance with another aspect of the disclosure, the method further comprises, prior to the step of communicating the well stream to the first separation apparatus, separating a first proportion of the solids fraction from the well stream.

The skid mounted separation system described herein provides a single system that allows operators to go straight into production from the drillout phase of operation, which greatly reduces the time and expense which otherwise would be required to configure and rig-up different systems for the different phases. During the drillout phase, the addition of a high efficiency desander upstream of the skid mounted system enables the separation system to employ high efficiency separation components in order to increase oil recovery, produce cleaner water, and meet custody transfer conditions at the outlet of the skid. By meeting custody transfer conditions at the outlet of the skid, the gas, oil and water can be piped or shipped directly to storage or processing facilities without the need for intermediate processing apparatuses or steps on site, which reduces the time and overall expense of the operation.

These and other objects and advantages of the present invention will be made apparent from the following detailed description, with reference to the accompanying drawings. In the drawings, the same reference numbers may be used to denote similar components in the various embodiments.

DETAILED DESCRIPTION

Figure 1:
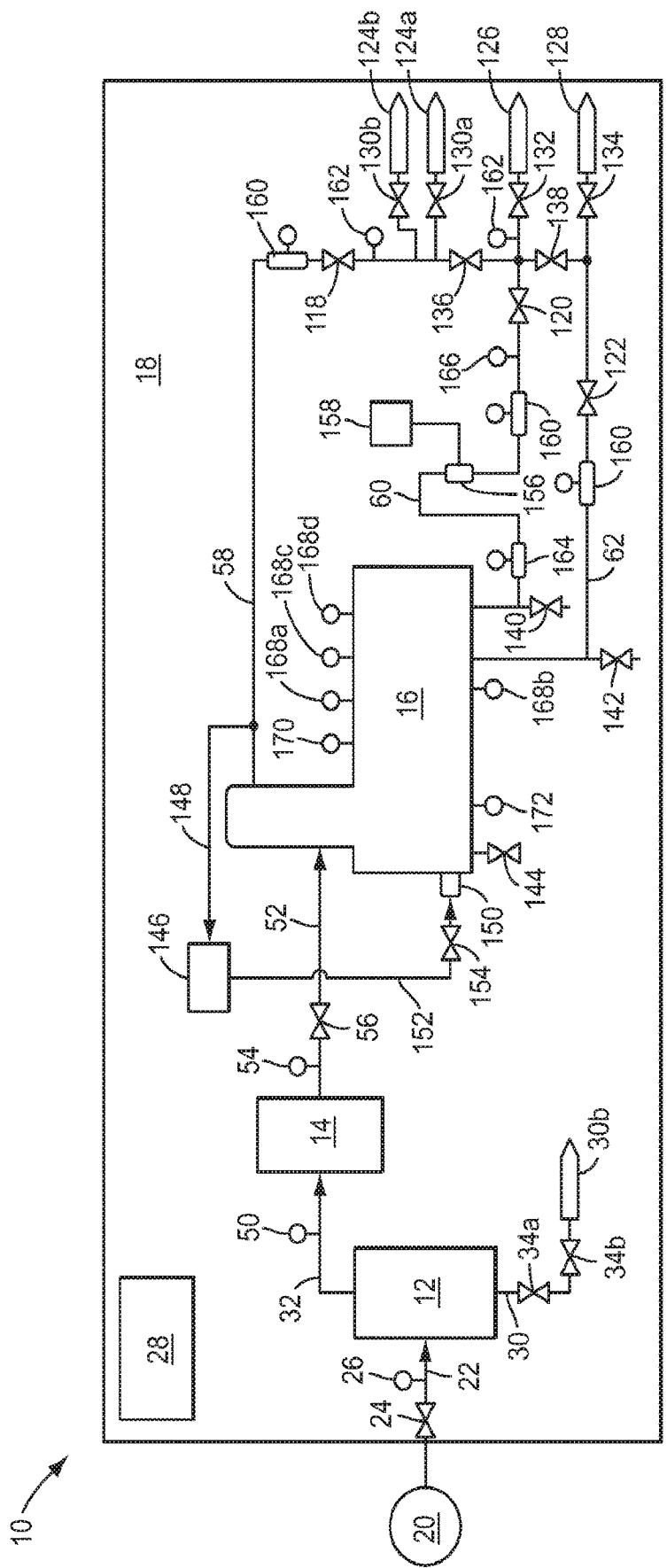
FIG. 1 is a schematic representation of a first embodiment of the separation system of the present disclosure.

A schematic representation of an illustrative embodiment of the separation system of the present disclosure is shown in FIG. 1. The separation system of this embodiment, which is indicated generally by reference number 10, includes a desander 12 which is connected to a choke manifold 14 that in turn is connected to a multiphase separator 16. The desander 12, choke manifold 14 and separator 16 are mounted on a common transportable support surface, such as a skid 18. The skid 18 enables the separation system 10 to be easily transported to the well site by, e.g., a trailer truck (not shown). In addition, mounting the desander 12, choke manifold 14 and separator 16 together on the skid 18 allows the connections between these components and their associated equipment to be made up prior to delivery of the separation system 10 to the well site, which will reduce the time required to set up and connect the separation system to other well site equipment.

In use, the separation system 10 is connected to an external apparatus 20 through which a stream of well fluid requiring processing flows. For example, the external apparatus may be a Christmas tree 20 which is installed at the top of a well bore (not shown). For purposes of illustration, one can assume that the well bore leads to a hydrocarbon formation on which a fracking operation has recently been completed. After the fracking operation has been completed and the well bore drilled out, the well enters a flowback phase. During the flowback phase, the well produces a multiphase fluid well stream which is primarily comprised of liquid, such as fracking water and formation fluids, and solids, such as fracking sand and other particulates.

The desander 12 operates to remove a large proportion of the sand and other particulates from the flowback well stream to thereby minimize the risk of erosion to downstream equipment and to allow the sand to be collected and reused, if desired. During the flowback phase of operation, the well fluid is communicated from the tree 20 to the desander 12 via an inlet line 22. The inlet line 22 may include a valve 24 for controlling the flow of the well stream into the separation system 10, and a sensor 26 for measuring a property of the well fluid. For example, the valve 24 may comprise an electrically actuated emergency shutdown valve, and the sensor 26 may comprise a pressure indicating transmitter, both of which may be connected to a system controller 28. In one possible mode of operation, should the well stream experience a pressure surge, as measured by the sensor 26, the system controller 28 will close the emergency shutdown valve 24 to prevent the pressure surge from damaging the separation system 10.

In the desander 12, the flowback well stream is separated into a first heavy fraction comprising primarily sand and a first light fraction comprising primarily water and formation fluids (i.e., gas and oil) with some entrained sand. The first heavy fraction is discharged through a heavy fraction outlet line 30, while the first light fraction is discharged through a light fraction outlet line 32. The heavy fraction outlet line 30 may comprise one or more valves 34a, 34b for controlling the discharge of the sand into a separate apparatus (not shown). In one embodiment, one or more of the valves 34a, 34b may be operated by the system controller 28. For example, a first valve 34a may comprise an electrically actuated plug valve which is operated by the system controller 28 to maintain a desired pressure in the desander 12, while a second valve 34b may comprise an electrically actuated ball valve which is opened by the system controller when the sand is to be discharged into the separate apparatus. The heavy fraction outlet line 30 may also include a customer sand outlet 30b through which a customer may recover the separated sand for reuse.

Figure 2:
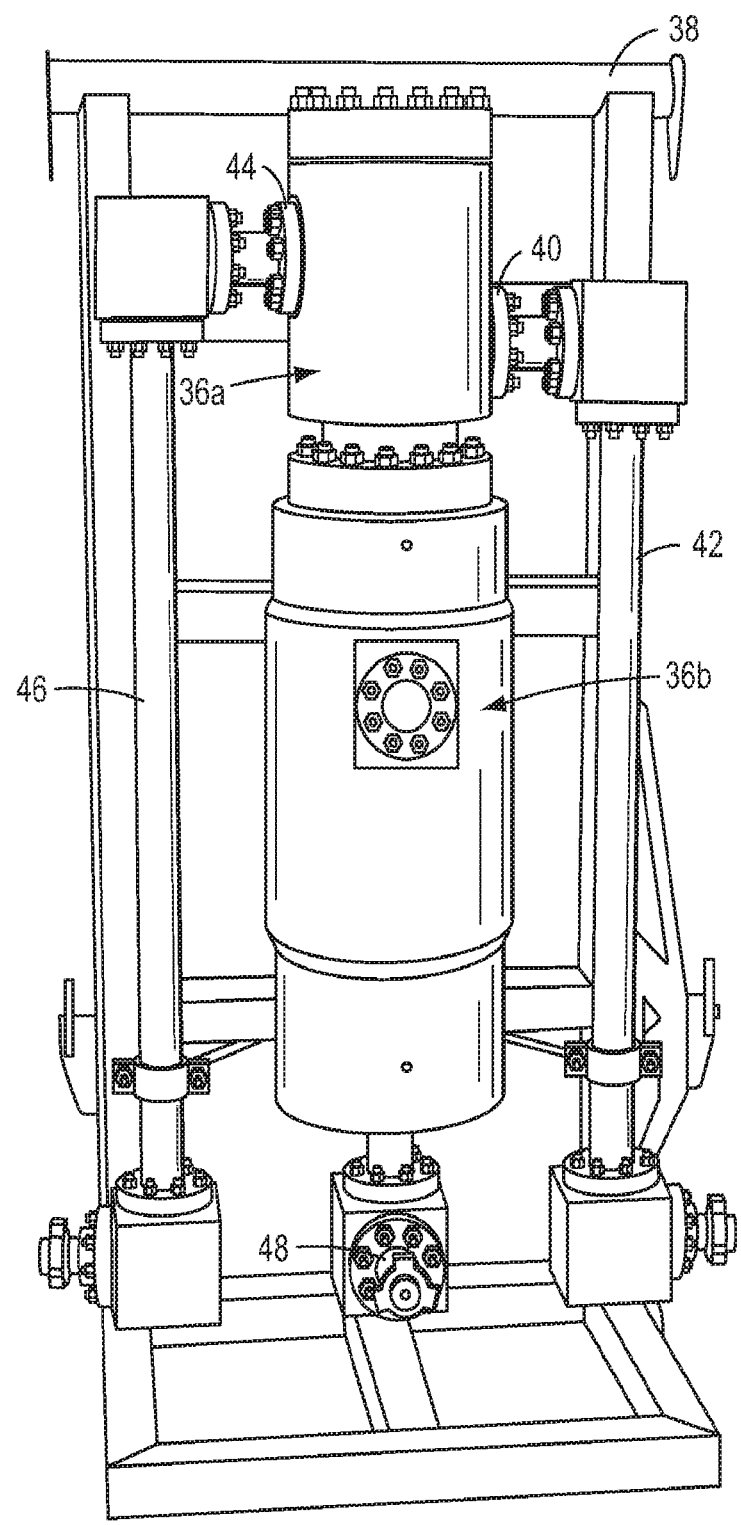
FIG. 2 is a perspective view of a desander which is suitable for use with the separation system shown in FIG. 1.

Referring also to FIG. 2, an example of a desander 12 which is suitable for use in the present embodiment of the separation system 10 is the cyclone-type InLine Desander™ desander sold by TechnipFMC of Houston, Tex. The desander 12 comprises a cyclone body 36a and a sand accumulation body 36b which is connected to the bottom of the cyclone body. The cyclone body 36a and the sand accumulation body 36b are supported on a frame 38 that in turn is connected to the skid 18. The cyclone body 36a includes a fluid inlet 40 which is connected to the inlet line 22 via a first conduit 42, and a light fraction outlet 44 which is connected to the light fraction outlet line 32 via a second conduit 46. Also, the sand accumulation body 36b includes a heavy fraction outlet 48 which is connected to the heavy fraction outlet line 30. The operation of the desander 12 is well understood by persons of ordinary skill in the art and will therefore not be described more fully herein. However, it should be understood that the desander 12 may comprise any other suitable separator which is capable of removing most of the sand from the flowback well stream.

The first light fraction, which as mentioned above primarily comprises water, oil and gas, exits the desander 12 and is conveyed through the light fraction outlet line 32 to the choke manifold 14. The light fraction outlet line 32 may include a sensor 50 for measuring a condition of the first light fraction. For example, the sensor 50 may comprise a pressure indicating transmitter which is connected to the system controller 28 and functions to measure the pressure of the first light fraction upstream of the choke manifold 14. As is understood by persons of ordinary skill in the art, the choke manifold 14 comprises a number of valves which regulate the flow rate and pressure of the first light fraction. In accordance with one embodiment of the disclosure, the valves may be actuated by the system controller 28 to achieve a desired pressure and/or flow rate of the first light fraction. The choke manifold 14 may also provide bypass pathways for, and access points to, the liquids fraction.

The first light fraction exits the choke manifold 14 and is conveyed through a separator inlet line 52 to the separator 16. The separator inlet line 52 may include a sensor 54 for measuring a property of the first light fraction downstream of the choke manifold 14, and a valve 56 for controlling the flow of the first light fraction between the choke manifold and the separator. For example, the sensor 54 may comprise a pressure indicating transmitter which is connected to the system controller 28 and functions to measure the pressure of the first light fraction downstream of the choke manifold 14, and the valve 56 may comprise an electrically actuated pressure control valve which is operated by the system controller to control the pressure of the first light fraction entering the separator 16. In one possible mode of operation, should the pressure of the first light fraction fluid upstream of the separator 16, as measured by the sensor 54, be greater than desired, the system controller 28 will operate the valve 56 to close the separator inlet line 52 until the pressure falls to the desired level.

Figure 3:
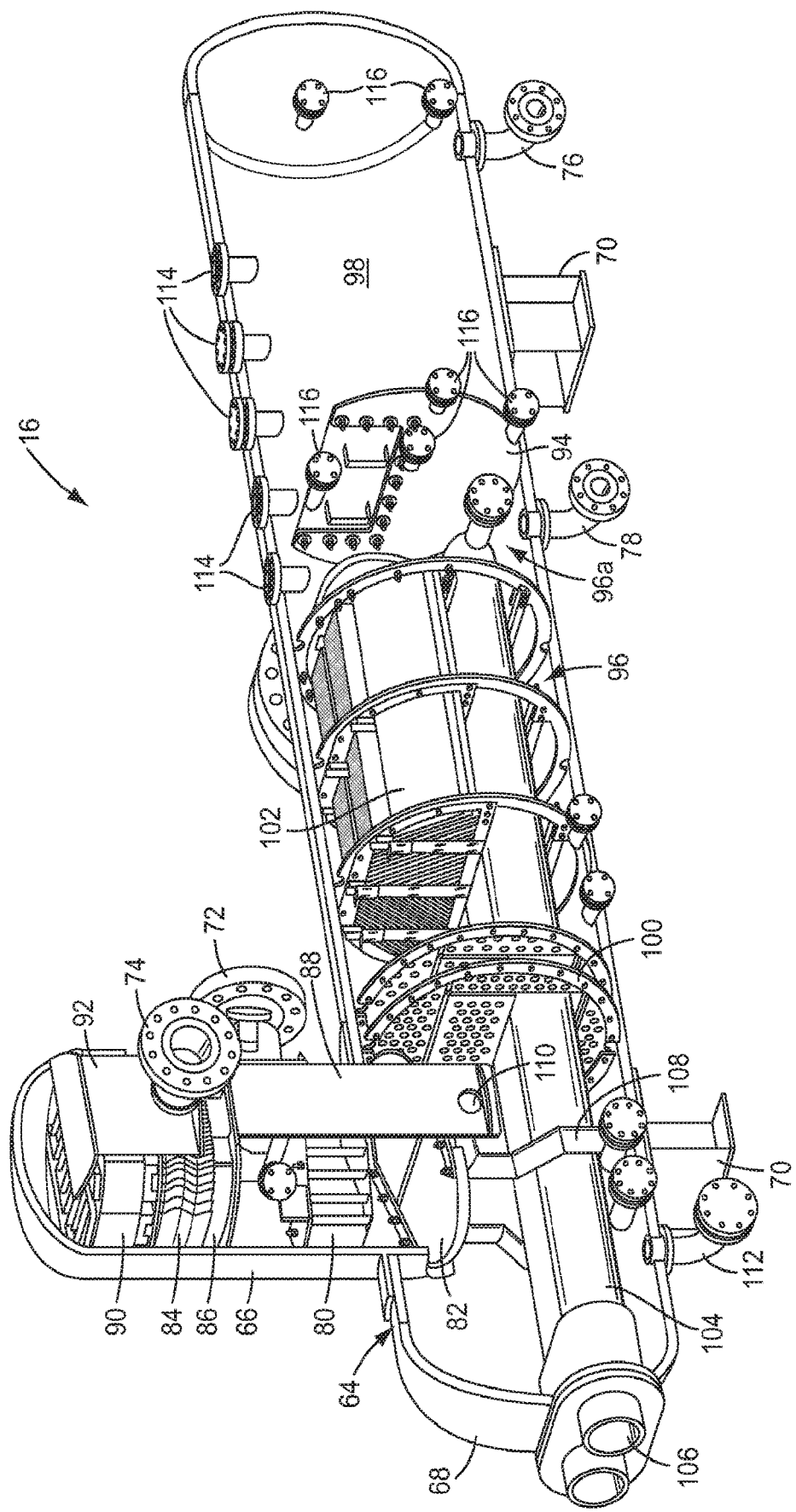
FIG. 3 is a perspective cut-away view of a multiphase fluid separator which is suitable for use with the separation system shown in FIG. 1.

The separator 16 functions to separate the first light fraction into a gas fraction which is discharged through a gas line 58, an oil fraction which is discharged through an oil line 60, and a water fraction which is discharged through a water line 62. Referring to FIG. 3, the separator 16 includes a separator vessel 64 which comprises a generally vertically extending upper separator section 66 and a generally horizontally extending lower separator section 68 which is positioned vertically below and is connected to the upper separator section. The separator vessel 64 is supported on a pair of feet 70 which extend from the lower separator section 68 and are connected to the skid 18. The upper separator section 66 includes an inlet port 72 to which the separator inlet line 52 is connected and a gas port 74 to which the gas line 58 is connected. The lower separator section 68 includes an oil port 76 to which the oil line 60 is connected and a water port 78 to which the water line 62 is connected. As shown in FIG. 3, the ports 72, 74, 76 and 78 may be provided with flanged connections to enable them to be bolted to corresponding flanged connections on the ends of the lines 52, 58, 60 and 62, respectively.

The upper separator section 66 is configured to separate the first light fraction into a second light fraction which primarily comprises the gas fraction and a second heavy fraction which primarily comprises the oil and water fractions. In an initial phase of the separation process, a majority of the second heavy fraction is separated from the second light fraction by means of gravity. After entering the upper separator section 66 through the inlet port 72, the first light fraction flows through a vane inlet device 80. The vane inlet device 80 reduces the momentum of the incoming flow stream in a controlled manner, which facilitates gravity separation of the bulk of the second heavy fraction from the second light fraction and evenly distributes the resulting flow of the second light fraction over the cross section of the upper separator section 66. A suitable vane inlet device for use in the separation system 10 of the present embodiment is the Evenflow HE inlet device sold by TechnipFMC of Houston, Tex.

After passing through the vane inlet device 80, the second heavy fraction flows down into the lower separator section 68 under the influence of gravity, while the second light fraction, which may be entrained with a "mist" of numerous fine second heavy fraction droplets, flows upwards through the upper separator section 66, where a desired proportion of the second heavy fraction droplets is removed. In one embodiment, the second heavy fraction exiting the vane inlet device 80 may flow onto a diverter plate 82 positioned between the upper separator section 66 and the lower separator section 68. This will help prevent the second heavy fraction in the lower separator section 68 from being re-entrained in the second light fraction stream and control turbulent flow of the second heavy fraction into the lower separator section.

Once the bulk of the second heavy fraction is separated from the second light fraction, the second light fraction undergoes one or more de-misting steps in the upper separator section 66 to remove a desired proportion of any remaining second heavy fraction droplets. For example, after the bulk of the second heavy fraction is separated from the second light fraction, the resulting mist-laden second light fraction passes through a de-misting device, such as a vane-type mist eliminator 84, which is positioned in the upper separator section 66 vertically above the vane inlet device 80. The mist eliminator 84 comprises a stack of parallel, vertically oriented chevron-shaped vane plates. As the mist-laden second light fraction passes through the vane plates, it is forced to change direction several times, which imparts centrifugal forces on the second heavy fraction droplets that cause the droplets to separate from the second light fraction and collect on the vane plates. The droplets coalesce on the vane plates, and the resulting liquid film is drained into a liquid sump 86 through slits or pockets positioned between the vane plates. From the liquid sump 86, the second heavy fraction may flow to the lower separator section 68 through a pair of channels which are each formed between a corresponding vertical divider plate 88 and the side wall of the upper separator section 66. Although the resulting stream is comprised primarily of the second light fraction, it may contain some remnant second heavy fraction droplets. A suitable vane-type mist eliminator for use in the separation system 10 of the present embodiment is the Mesh Pad Demister sold by TechnipFMC of Houston, Tex.

In the illustrative embodiment of the disclosure shown in FIG. 3, after passing through the mist eliminator 84, the second light fraction flows upward through a second de-misting device, such as a mesh-type demister 90. In one embodiment, the mesh-type demister comprises several layers of knitted wire mesh supported on an open grid. The second light fraction flows unimpeded through the wire mesh, but the inertia of the second heavy fraction droplets causes them to impact on the surfaces of the wires. As a result, the droplets collect and coalesce on the wires, and when the droplets reach a certain size, they fall off the wires due to gravity and flow into the lower separator section 68 through the channel formed between the vertical divider plate 86 and the side wall of the upper separator section 66. A suitable mesh demister for use in the separation system 10 of the present embodiment is the Vane Pack XHE Agglomerator sold by TechnipFMC of Houston, Tex. After passing through the mesh demister 90, the second light fraction is directed by a baffle 92 through the gas outlet 74 and into the gas line 58.

The second heavy fraction from the upper separator section 66 proceeds through the lower separator section 68 from left to right as viewed in FIG. 3. The lower separator section 68 is configured to separate the second heavy fraction into a third light fraction which primarily comprises the oil fraction and a third heavy fraction which primarily comprises the water fraction. In the illustrative embodiment of the invention shown in FIG. 3, the lower separator section 68 includes a divider plate 94 which extends from the bottom of the lower separator section to a distance below the top of the lower separator section and separates the lower separator section into an oil/water chamber 96 located upstream of the divider plate and an oil chamber 98 located downstream of the divider plate. As the second heavy fraction flows through the oil/water chamber 96, gravity causes the water fraction to drop toward the bottom of the flow stream while the oil fraction rises toward the top. In one embodiment of the present disclosure, the flow stream passes through one or more perforated distribution baffles 100 in the oil/water chamber 96. The baffles 100 function to create an equally distributed, quiescent flow regime that enhances the effectiveness of the gravity separation process.

The flow stream then passes through a plate pack coalescer 102 which is mounted in the oil/water chamber 96 downstream of the baffles 100. The plate pack coalescer 102 comprises a plurality of parallel plates which are oriented at fixed angle relative to the horizontal mid-plane of the lower separator section 68. Due to the fact that the flow between the plates lies in the laminar regime, smaller droplets of oil and water fractions can be separated by the plate pack coalescer 96 than by gravity alone. Furthermore, since the distance between the plate surfaces is small, the dispersed oil and water droplets need travel only a short distance until they reach the oil/water interface. Consequently, separation of the oil and water fractions can be effectively achieved over the relatively short length of the plate pack coalescer 102.

After passing through the plate pack coalescer 102, the substantially separated oil and water flow stream encounters the divider plate 98. By the time the flow stream exits the plate pack coalescer 102, the upper portion of the flow stream is comprised primarily of the oil fraction while the lower portion of the flow stream is comprised primarily of the water fraction. As a result, as the flow stream progresses through the oil/water chamber 96, the oil will flow over the top of the divider plate 94 and into the oil chamber 98, while the water will remain in a lower portion 96*a* of the oil/water chamber 96 which is located immediately upstream of the divider plate. The oil will then be discharged through the oil port 76 into the oil line 60, and the water will be discharged through the water port 78 into the water line 62.

Referring still to FIG. 3, the separator 16 may be provided with a heating system to control the temperature of the water/oil fraction in order to increase the effectiveness of the gravity separation process and protect against freezing during an upset event. The heating system may comprise, e.g., a U-shaped heat tube 104 which extends from the upstream end of the lower separator section 68 to below the plate pack coalescer 102, and a burner (not shown) which is mounted in an opening 106 of the heat tube. As will be described below, the burner may be controlled by the system controller 28 in order to maintain the water/oil fraction within a desired temperature range.

As mentioned above, the second heavy fraction droplets which are separated from the second light fraction stream by the mist eliminator 84 and the mesh demister 90 coalesce into a liquid which flows into the lower separator section 68 through a pair of channels which are each formed between a corresponding vertical divider plate 88 and the side wall of the upper separator section 66. In one embodiment of the present disclosure, this second heavy fraction liquid may be made to flow from the channels to the bottom of the lower separator section 68 through a pair of tubes 108, each of which is connected to a corresponding channel through an opening 110 in a respective divider plate 88. This will ensure that the second heavy fraction liquid is not introduced into the upper portion of the flow stream in the oil/water chamber 96, which could prevent the liquid from being effectively separated into the oil and water fractions prior to reaching the divider plate 94.

Depending on the amount of solids fraction, such as sand, contained in the well stream, which in a flowback well stream can be significant, the desander 12 may not be able to separate all of the sand out of the wellstream. This remaining sand will remain entrained with the first light fraction and consequently be carried into the separator 16. As the first light fraction passes through the vane inlet device 80, the sand, along with the majority of the second heavy fraction, will be separated by gravity from the second light fraction and fall into the lower separator section 68. Due to its relatively large density compared to water and oil, the sand will quickly settle to the bottom of the oil/water chamber 96. In one embodiment of the present disclosure, therefore, the separator 16 may be provided with a sand outlet 112 through which the sand may be removed. The sand outlet 112 may be closed by a removable end cap, as shown in FIG. 3, or provided with a valve for controlling the discharge of the sand through the sand outlet.

Referring still to FIG. 3, in accordance with a further embodiment of the present disclosure, the separator 16 may comprise a number of sensor ports 114 to which corresponding sensors may be connected. Examples of such sensors will be described below. In addition to the sensor ports, the separator 16 may comprise a number of pairs of sight glass ports 116 distributed along the length of the lower separator section 68. Each of a number of sight glasses (not shown) may then be connected to a corresponding pair of sight glass ports 116 to enable the level of the fluid in the lower separator section 68 to be visually observed.

Referring again to FIG. 1, the gas line 58, the oil line 60 and the water line 62 may each comprise a corresponding valve 118, 120, 122 for controlling fluid flow through the line. The valves 118, 120, 122 may comprise, e.g., electrically actuated valves which are controlled by the system controller 28. In addition, each of the gas line 58, the oil line 60 and the water line 62 is connected to a respective customer outlet 124*a*, 126, 128, preferably via a corresponding valve 130*a*, 132, 134, such as a ball valve, which may optionally be electrically actuated by the system controller 28. The gas line 58 may also be connected to an outlet 124*b* for a flare device (not shown) via a corresponding valve 130*b*, which may be similar to the valve 130*a*.

In one embodiment of the present disclosure, the gas line 58 and the water line 62 may each be connected to the oil line 60 via respective valves 136, 138, such as plug valves, which may optionally be electrically actuated by the system controller 28. The valves 136, 138 are normally closed to ensure that the gas, water and oil streams remain separate. However, the valves 136, 138 may be opened should the need arise to combine the streams into a single flow stream.

The oil line 60 and the water line 62 may also be provided with respective dump valves 140, 142 for selectively emptying oil and water from the separator 16. The valves 140, 142 may comprise, e.g., ball valves, which may optionally be electrically actuated by the system controller 28. The sand outlet 112 (FIG. 3) may likewise be provided with a valve 144 for selectively discharging sand from the separator 16. The valve 144 may comprise, e.g., a ball valve, which may optionally be electrically actuated by the system controller 28.

As mentioned above, in one embodiment of the present disclosure the separator 16 may comprise a heating system for maintaining the temperature of the water/oil fraction within a desired temperature range. As shown in FIG. 1, the heating system may include a gas conditioning unit 146 which receives gas through a tap line 148 that is connected to the gas line 58. As is understood by persons of ordinary skill in the art, the conditioning unit 146 prepares the gas for use by a burner 150 which is connected to the heat tube 104 (FIG. 3). The burner 150 may be a controllable burner which is operated by the system controller 28. Gas from the conditioning unit 146 is communicated to the burner 150 through a feed line 152. The feed line 152 may include a valve 154 for controlling the flow of gas to the burner 150. The valve may comprise, e.g., an electrically actuated temperature control valve which is operated by the system controller 28.

Referring still the FIG. 1, the separation system 10 may include means for sampling the oil which is discharged from the separator 16. For example, the oil line 60 may comprise a conventional sample probe assembly 156 which is selectively operable to communicate a portion of the oil in the oil line to a sample receiver 158, where it may be collected and analyzed. In one embodiment, the sample probe assembly 156 may be operated by the system controller 28.

In accordance with a further illustrative embodiment of the disclosure, all of the non-manually actuated valves employed in the separation system 10 are electrically actuated valves. This enables the valves to be powered by a suitable source of electrical power, such as a battery (not shown) mounted on the skid 18. Consequently, none of the gas or other fluid produced by the separation system need be used to power the non-manually actuated valves. As a result, more of hydrocarbons produced by the separation system can be sold.

Still referring to FIG. 1, the separation system 10 ideally includes a number of sensors for measuring a variety of parameters of the fluid at various stages in the system. Several of these sensors (sensors 26, 50 and 54) were discussed above. In addition, the gas line 58, the oil line 60 and the water line 62 may each comprise a respective flow meter 160 for measuring the flow rate of the fluid in the line. The flow meters 160, which may be connected to the system controller 28, may comprise, e.g., coriolis mass flow meters, such as the Promass™ coriolis mass flow meter sold by TechnipFMC of Houston, Tex. Each of the gas line 58 and the oil line 60 may also comprise a corresponding pressure sensor 162, such as a pressure indicating transmitter, for measuring the pressure of the fluid in the line. If desired, the oil line 60 may also include a basic sediment and water (BS&W) sensor 164 for measuring the sediment and water content of the oil discharged from the separator 16, and a temperature sensor 166, such as a resistance temperature detector (RTD) sensor, for measuring the temperature of the oil. As with the flow meters 160, one or more of the pressure sensors, the BS&W sensor 164 and the temperature sensor 166 may be connected to the system controller 28.

The separator 16 may also include a number of sensors for measuring certain parameters of the fluid in, for instance, the lower separator section 68. For example, the separator 16 may comprise a number of suitable liquid level sensors 168 for measuring the top and bottom levels of the liquid in the oil/water chamber 96, the top and bottom levels of the liquid in the oil chamber 98, and the level of the oil/water interface in the oil/water chamber. For instance, in an illustrative embodiment of the disclosure the separator 16 may include a high liquid level sensor 168a for indicating when the liquid in the oil/water chamber 96 has reached a pre-set high liquid level, a low liquid level sensor 168b for indicating when the liquid in the oil/water chamber has reached a pre-set low liquid level, a guided wave radar (GWR) sensor 168c for measuring the levels of both the top of the liquid and the water/oil interface in the oil/water chamber, and a GWR sensor 168d for measuring the top level of the oil in the oil chamber 98. In addition, the separator 16 may include a pressure sensor 170, such as a pressure indicating transmitter, and a temperature sensor 172, such as an RTD sensor, for measuring the pressure and temperature, respectively, of the fluid in the separator. One or more of the sensors 168, 170 and 172 may be connected to the system controller 28.

In an exemplary embodiment of the present disclosure, the system controller 28 is configured to control the operation of one or more functions of the separation system 10 based on inputs from one of more of the various sensors described above. The following examples describe some of the functions the system controller 28 may be configured to perform.

In one embodiment, the system controller 28 may be configured to close the emergency shutdown valve 24 if it receives a signal from one of the pressure sensors 26, 50, 54, 162, 170 indicating that the pressure measured by that sensor has reached a pre-set high level.

In another embodiment, the system controller 28 may be configured to close the emergency shutdown valve 24 if it receives a signal from the level sensor 168a indicating that the level of the fluid in the oil/water chamber 96 has reached a pre-set high level, or if it receives a signal from the level sensor 168c indicating that the level of the oil/water interface in the oil/water chamber 96 has dropped to a pre-set low level, or if it receives a signal from the level sensor 168d indicating that the level of the oil in the oil chamber 98 has reached a pre-set low level, or if it receives a signal from a level sensor on the sand separator 12 (not shown) that the level of the solids fraction in the sand accumulation body 36b has reached a pre-set high level.

In the event of an emergency shutdown, the system controller 28 may be configured to close some or all of the control valves in the separation system 10 in a certain order. For example, after the emergency shutdown valve 24 has been closed, the system controller 28 may be configured to then close the pressure control valve 56. This is done to prevent trapping high pressure fluid between emergency shutdown valve 24 and the pressure control valve 56.

The system controller 28 may also be configured to control the level of the sand in the desander 12 by selectively opening and closing the valves 34a, 34b in order to discharge the sand from the sand accumulation chamber 36b. The procedure for discharging the sand may have two operating modes which are selectable via a human machine interface (HMI) connected to the system controller 28 (not shown). These modes are Time Mode and Level Mode. In the Time Mode, the system controller 28 controls the sand discharge procedure based on the frequency (in hours) and duration (in seconds) of the opening of the valves 34a, 34b, which values may be pre-set by the operator. In the Level Mode, the system controller 28 controls the sand discharge procedure based on inputs from high and low level sensors on the sand accumulation body 36b (not shown). In both cases, the system controller 28 may be configured to actuate the valves 34a, 34b as follows: open valve 34b, then open valve 34a for a pre-set time, then close valve 34a, then close valve 34b.

The system controller 28 may also be configured to monitor the condition of the desander 12 based on pressure measurements from the sensors 26 and 50. In this example, the system controller 28 calculates the differential pressure across the desander 12 based on the inputs from the pressure sensors 26, 50 and, if the differential pressure reaches a certain pre-set high value, which indicates that the desander is clogged, the system controller 28 may be configured to generate an alarm and/or close the emergency shutdown valve 24.

Similarly, the system controller 28 may be configured to monitor the condition of the choke manifold 14 based on pressure measurements from the sensors 50 and 54. In this example, the system controller 28 calculates the pressure differential across the choke manifold 14 based on the inputs from the pressure sensors 50, 54. If the pressure differential reaches a pre-set high value, which indicates that the choke manifold 14 is clogged, the system controller 28 may be configured to generate a DP high alarm and/or close the emergency shutdown valve 24. If the pressure differential drops to a pre-set low value, which indicates the choke manifold 14 has eroded, the system controller 28 may be configured to generate a DP low alarm and/or close the emergency shutdown valve 24. These alarms may be based on a percentage of the differential set points of the sensors 50, 54. For example, the low DP alarm may be set at 80% of set point differential and the high DP alarm may be set at 120% of set point differential.

The system controller 28 may likewise be configured to control the operation of certain aspects of the separator 16. For example, the system controller 28 may be configured to position the gas line control valve 118, the oil line control valve 120 and the water line control valve 122 to predetermined percent open/close values based on the measurements obtained from the GRW level sensors 168c and 168d.

The system controller 28 may also be configured to control the level of the fluid in the oil/water chamber 96 and the level of the oil/water interface in the oil/water chamber 96. These levels may be measured by the GRW level sensor 168b. If the level of the oil/water interface reaches a pre-determined high level, the system controller 28 will open the water line control valve 122 further to increase the flow of water from the oil/water chamber 96. Similarly, if the top level of the fluid in the oil/water chamber 96 reaches a pre-set high level, the system controller will close the gas line control valve 118 and open the water line control valve 122 further to increase the flow of water from the oil/water chamber 96. In this regard, the system controller 28 may be configured to adjust the position of the water line control valve 122 from, e.g., 20% open to 80% open based on the level of the oil/water interface.

Also, the system controller may be configured to operate the gas line control valve 118 based on a number of inputs, such as the pressure within the separator 16 (as measured by the pressure sensor 170), or the level of the fluid in the oil/water chamber 96 (as measured by the level sensor 168c). If the pressure in the separator 16 reaches a pre-set high level, or as a secondary override, if the level of the fluid in the oil/water chamber 96 reaches a pre-set high level, the system controller will close the valve 118 to thereby force the oil and water fractions out of their respective outlets 76, 78. Then, once the pressure within the separator 16 falls to within a pre-set acceptable range and the level of the fluid in the oil/water chamber 96 drops to within a pre-set acceptable range, the system controller 28 will close the gas line control valve 118.

In another example, if the measurements from the level sensor 168a indicate that the rate of change of the level of the fluid in the oil/water chamber 96 is increasing at greater than a pre-set value (e.g., 6 inches per minute), the system controller 28 may determine that a slug flow is occurring. In this event, the system controller 28 may be configured to initiate a slug handling procedure. For example, the system controller 28 may be configured to close the gas line control valve 118 (to increase the pressure in the separator 16), set the pressure control valve 56 to 25% open, and maintain the oil line control valve 120 and the water line control valve 122 in their normal operating conditions. This will allow the liquid slug to be evacuated from the separator 16. Then, when the level measured by the level sensor 168a indicates that the top level of the fluid in the oil/water chamber 96 has fallen to a certain distance (e.g., 3 inches) below the setpoint of the liquid level switch 68a, the system controller 28 may be configured to return the pressure control valve 56 and the gas line control valve 118 to their normal operating conditions.

In yet another example, if the pressure sensor 170 senses decreasing pressure in the separator 16 and the flow sensors measure decreasing flow rates in the gas, oil and water lines 58, 60, 62, indicating that the well is about to log off, the system controller 28 may be configured to fully open the gas line control valve 118 in order to decrease back pressure on the well bore.

Figure 4:
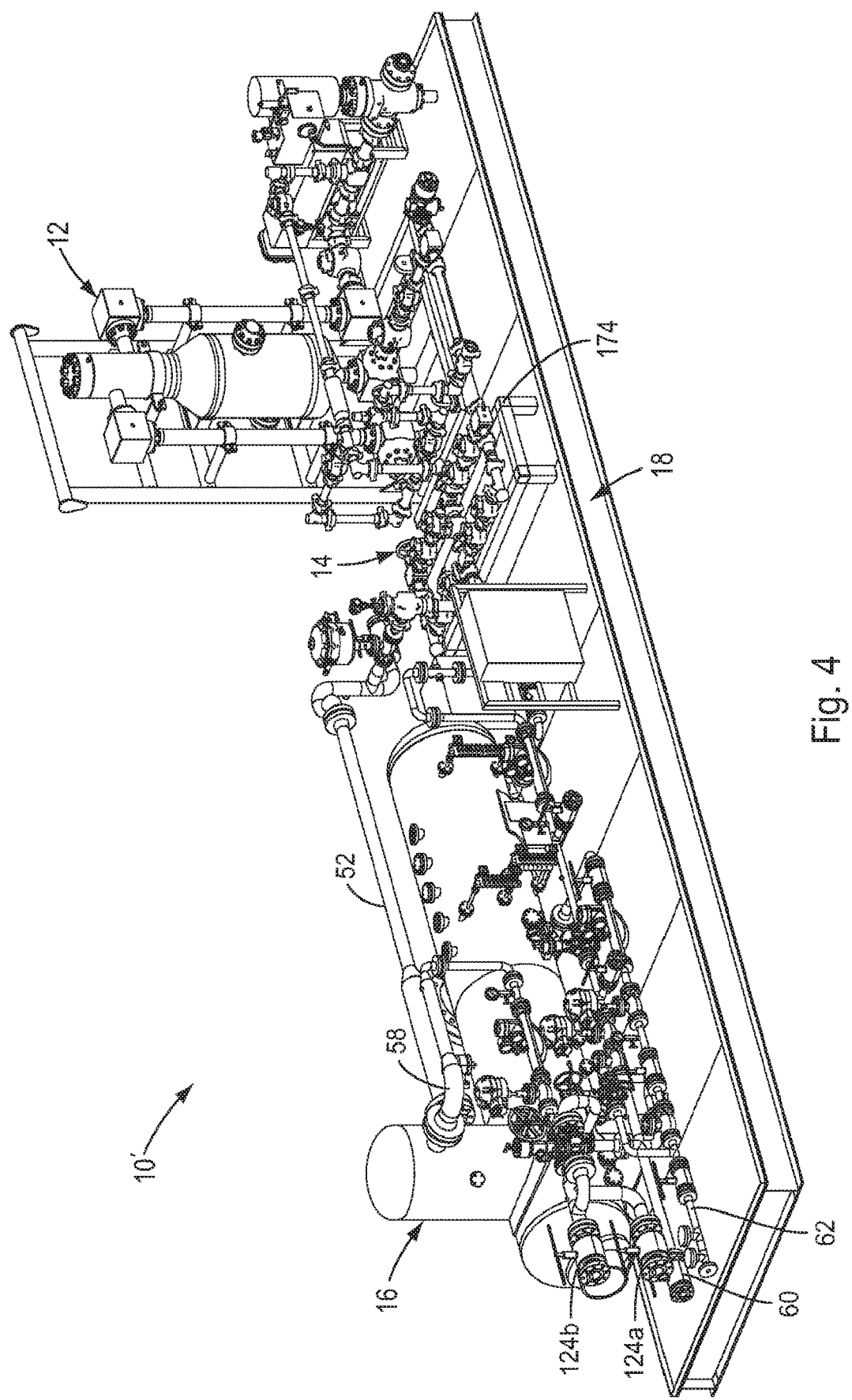
FIG. 4 is a perspective view of another embodiment of the separation system of the present disclosure.

An example of a physical embodiment of a separation system in accordance with the present disclosure is shown in perspective in FIG. 4. The separation system of this embodiment, generally 10', is similar in many respects to the separation system 10 described above. Hence, one can see the arrangement of the desander 12, the choke manifold 14 and the separator 16 on the skid 18. In addition, the various connections of the separator inlet line 52, the gas line 58, the oil line 60 and the water line 62, as well as the customer gas outlet 124a and the flare outlet 124b, can be perceived. As shown in FIG. 4, the choke manifold 14 may be supported on a platform 174 which in turn is connected to the skid 18.

Figure 5:
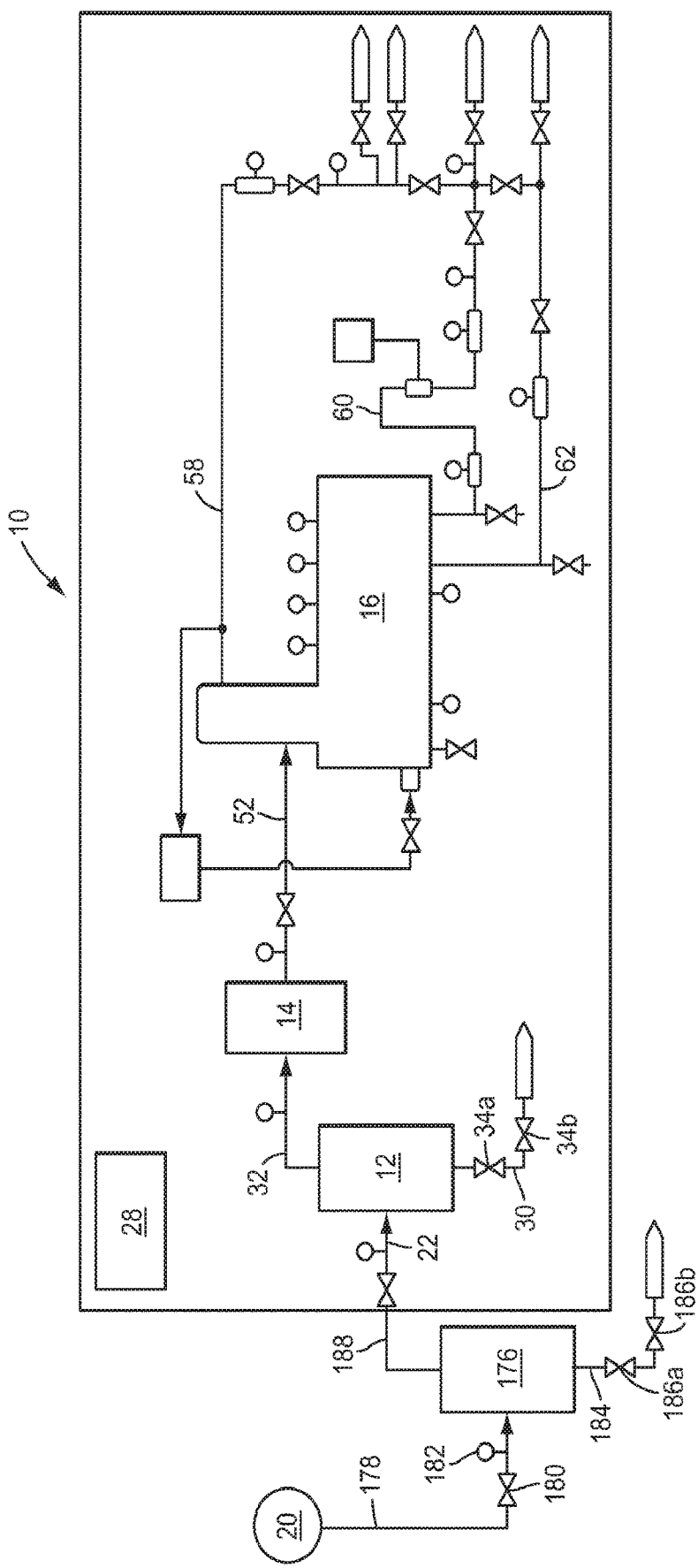
FIG. 5 is a schematic representation of yet another embodiment of the separation system of the present invention.

A further embodiment of a separation system in accordance with the present disclosure, which is particularly useful during the drillout phase of operation, is shown in FIG. 5. This separation system of this embodiment comprises the skid mounted separation system 10 described above. In the present embodiment, however, a second desander 176 is connected between the tree 20 and the first desander 12. In particular, the tree 20 is connected to the second desander 176 by a feed line 178. The feed line 178 may comprise a valve 180 for controlling the flow of well fluid into the second desander 176 and a sensor 182 for measuring a condition of the well fluid, such as pressure. For example, the valve 180 may comprise an electrically actuated emergency shutdown valve, and the sensor 182 may comprise a pressure indicating transmitter, both of which may be connected to the system controller 28 of the separation system 10 by a signal cable (not shown). In one possible mode of operation, should the well stream experience a pressure surge, as measured by the sensor 182, the system controller 28 will close the emergency shutdown valve 180 to prevent the pressure surge from damaging the separation system 10.

In the desander 176, the multiphase well fluid is separated into a heavy phase comprising primarily sand and a light phase comprising primarily water, formation fluids (e.g., gas and oil) and sand. In this regard, due to the relatively large volume of sand in the drillout well fluid, the desander 176 will likely not be able to separate all of the sand out of the multiphase fluid. Therefore, a proportion of the sand will remain entrained in the light phase.

The heavy phase (i.e., sand) exits the separator 176 through a sand outlet line 184 which, like the sand outlet line 30 of the separation system 10, may comprise one or more valves 186a, 186b for controlling the discharge of the sand into a separate apparatus (not shown). Similar to the valves 34a, 34b, one or more of the valves 186a, 186b may be operated by the system controller 28. For example, the first valve 186a may comprise an electrically actuated plug valve and the second valve 186b may comprise an electrically actuated ball valve, both of which may be operated similar to the valves 134a, 134b by the system controller 28 when the sand is to be discharged into the separate apparatus.

The light phase, comprising mainly water, gas, oil and sand, exits the separator 176 through a liquids outlet line 188 which is connected to the inlet line 22 of the separation system 10. As the light phase passes through the first separator 12, most of the remaining sand will be removed. The light phase will then proceed through the separation system 10 in the manner described above and be separated into separate gas, oil and water fractions.

Figure 6:
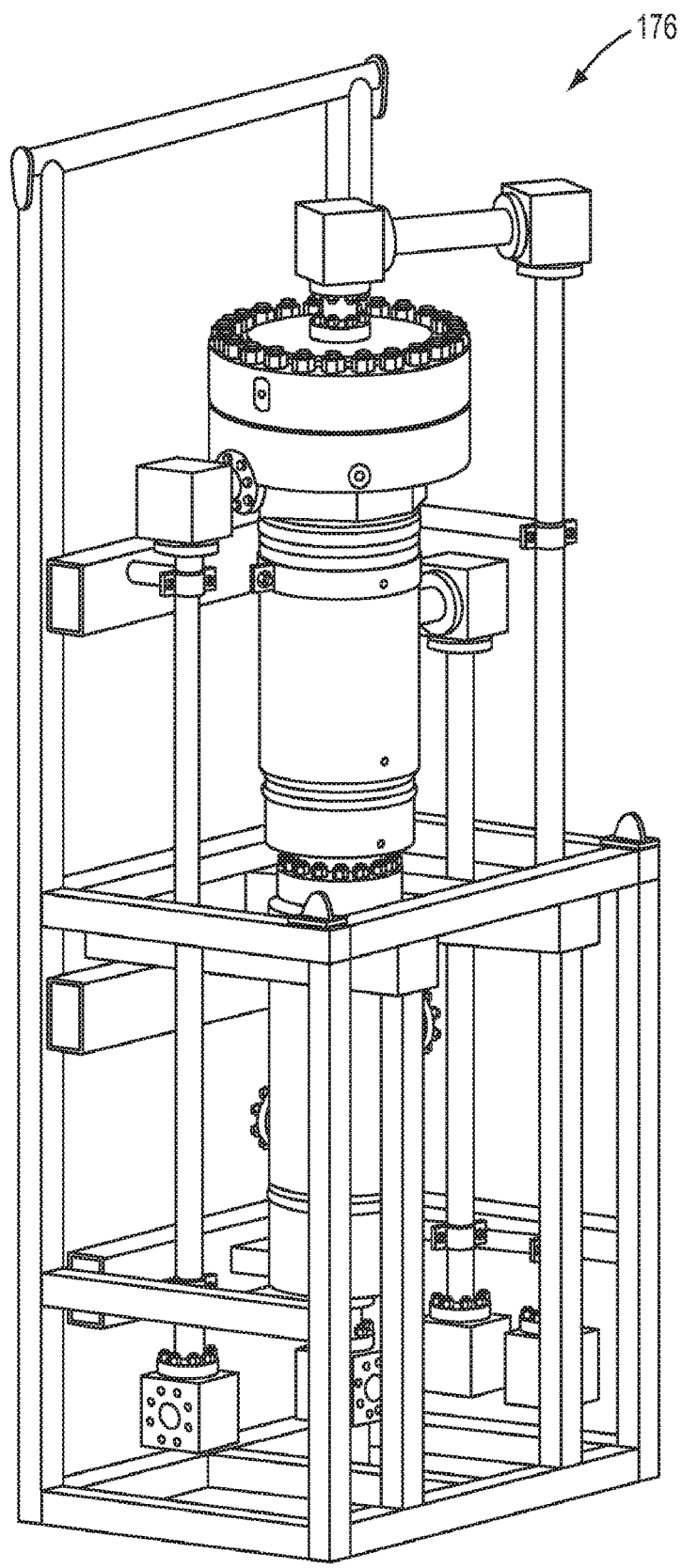
FIG. 6 is a perspective view of a desander which is suitable for use with the separation system shown in FIG. 5.

A suitable desander 176 for use in the separation system illustrated in FIG. 5 is shown in FIG. 6. This desander is disclosed in applicant's International Patent Application Publication No. WO 2017/080936 A1 published on May 18, 2017, which is hereby incorporated herein by reference.

In each of the embodiments described above, the separation system may be operated such that the separate gas, oil and water fractions produced at the respective customer outlets 124a, 126, 128 meet certain requirements, such as less than 7 pounds of free water per MMSCF gas, less than 1% water in oil, and less than 1% oil in water. In this manner, excluding customer specific GVF requirements, the gas, water and oil will not require further processing at the well site before they can be transferred to the customer. As a result, excluding customer specific GVF requirements, additional processing equipment at the well site will not be required. Also, no need will exist to transport the gas, water, and oil to an offsite processing facility to bring them up to custody transfer standards. Thus, the costs and logistics required to transport the gas, water and oil to the separate processing facility can be avoided.

In the illustrative embodiment of the present disclosure, the separator 16 includes an upper separator section 66 and a lower separator section 68 positioned vertically below and connected to the upper separator section. The upper separator section 66 is configured to separate the first light fraction into a second light fraction which primarily comprises the gas fraction and a second heavy fraction which primarily comprises the oil and water fractions, and the lower separator section 68 is configured to separate the second heavy fraction into a third light fraction which primarily comprises the oil fraction and a third heavy fraction which primarily comprises the water fraction. This unique integration of two separator sections 66, 68 into a single separator 16 offers several advantages over prior art systems which employ two or more distinct separators to perform the same functions. In particular, the separator 16 enables both the construction and the process control systems of the separation system to be simplified. For example, the single separator 16 requires only a single set of inlet/outlet lines, connectors and valves to convey the various fractions, while prior art systems which employ two or more distinct separators require separate inlet/outlet lines, connectors and valves for each separator. Also, the separator 16 requires only one pressure control valve, one inlet line pressure sensor and one vessel pressure sensor to control the pressure in the separator, while prior art separation systems require separate pressure control valves, inlet line pressure sensors and vessel pressure sensors for each separator. As a result, the separator 16 is less complex, both structurally and electrically, and is therefore less expensive to manufacture and less prone to breakdowns.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A separation system for separating a multiphase well stream into a solids fraction, a water fraction, an oil fraction and a gas fraction, the system comprising:

a transportable support surface;

a first solids separator which is mounted on the support surface and is configured to receive the multiphase well stream and separate the well stream into a first heavy fraction primarily comprising the solids fraction and a first light fraction primarily comprising the gas, oil and water fractions;

a multiphase fluid separator which is mounted on the support surface, the multiphase fluid separator comprising a separator vessel which includes a generally cylindrical, vertically oriented first separator section and a generally cylindrical, horizontally oriented second separator section, the first separator section being positioned vertically above and connected directly to an upstream end of the second separator section;

wherein the first separator section is configured to receive the first light fraction and separate the first light fraction into a second light fraction primarily comprising the gas fraction and a second heavy fraction primarily comprising the oil and water fractions; and wherein the second separator section is configured to receive the second heavy fraction and separate the second heavy fraction into a third light fraction primarily comprising the oil fraction and a third heavy fraction primarily comprising the water fraction.

2. The separation system of claim 1, further comprising:
a second solids separator which is connected between a source of the well stream and the first solids separator, the second solids separator being configured to separate a proportion of the solids fraction from the well stream.

3. The separation system of claim 2, wherein the second solids separator is not mounted on the transportable support surface.

4. The separation system of claim 1, wherein the gas fraction is discharged from the multiphase fluid separator through a gas line which is connected to the first separator section, and wherein the oil and water fractions are discharged from the multiphase fluid separator through respective oil and water lines which are connected to the second separator section.

5. The separation system of claim 4, wherein the second separator section comprises an oil/water chamber which is configured to receive the second heavy fraction and separate the second heavy fraction into the third light fraction and the third heavy fraction.

6. The separation system of claim 5, wherein the second separator section comprises an oil chamber which is located downstream of the oil/water chamber and is configured to receive the third light fraction from the oil/water chamber.

7. The separation system of claim 6, wherein the oil line is connected to the oil chamber and the water line is connected to the oil/water chamber.

8. The separation system of claim 7, wherein the gas line, the oil line and the water line are each connected to a corresponding customer outlet through which the separate gas, oil and water fractions are discharged from the system.

9. The separation system of claim 8, further comprising a first flow meter which is positioned in the gas line, a second flow meter which is positioned in the oil line and a third flow meter which is positioned in the water line.

10. The separation system of claim 7, further comprising:
a first inlet line through which the well stream is communicated to the solids separator;
a second inlet line through which the first light fraction is communicated to the multiphase fluid separator;
a first valve which is positioned in the first inlet line;
a second valve which is positioned in the second inlet line;
a third valve which is positioned in the gas line;

a fourth valve which is positioned in the oil line;

a fifth valve which is positioned in the water line; and a system controller which is configured to control the position of each of the valves in response to one or more measured system parameters.

11. The separation system of claim 10, wherein the measured system parameters include a pressure in the first inlet line, a pressure in the multiphase fluid separator, a top level of the oil fraction in the oil/water chamber, a bottom level of the water fraction in the oil/water chamber, a level of an interface between the oil and water fractions in the oil/water chamber, a top level of the oil fraction in the oil chamber, a flow rate of the gas fraction in the gas line, a flow rate of the oil fraction in the oil line and a flow rate of the water fraction in the water line.

12. The separation system of claim 11, wherein the measured system parameters further include a pressure difference across the solids separator.

13. The separation system of claim 11, further comprising a choke manifold which is connected between the solids separator and the multiphase fluid separator, and wherein the measured system parameters further include a pressure difference across the choke manifold.

14. The separation system of claim 10, wherein the first through fifth valves are electrically actuated valves.

15. The separation system of claim 1, wherein the gas fraction, the oil fraction and the water fraction are each discharged from the separation system through a corresponding customer outlet, and wherein the separation system is configured such that at least one of the gas fraction, the oil fraction and the water fraction at its corresponding customer outlet meets or exceeds the following custody transfer standards: less than 7 pounds of free water per MMSCF gas, less than 1% water in oil, and less than 1% oil in water.

16. The separation system of claim 15, wherein the separation system is configured such that each of the gas fraction, the oil fraction and the water fraction at their corresponding customer outlets meets or exceeds the following custody transfer standards: less than 7 pounds of free water per MMSCF gas, less than 1% water in oil, and less than 1% oil in water.

17. The separation system of claim 1, wherein the first separator section is configured to separate at least a first proportion of the second heavy fraction from the second light fraction by means of gravity.

18. The separation system of claim 17, wherein the first separator section comprises at least one de-misting device which is configured to separate a second proportion of the second heavy fraction from the second light fraction.

19. The separation system of claim 18, further comprising means for conveying the second proportion of the second heavy fraction to the second separator section separately from the first proportion of the second heavy fraction.

20. The separation system of claim 19, wherein the first separator section comprises an inlet port through which the first light fraction is received, a gas port through which the gas fraction is discharged, and a vane inlet device which is connected to the inlet port vertically below the gas port.

21. The separation system of claim 20, wherein said at least one de-misting device is positioned vertically above the vane inlet device.

22. The separation system of claim 21, wherein said at least one de-misting device comprises two demisting devices positioned one over the other.

23. The separation system of claim 18, wherein the second separator section is configured to separate at least a first proportion of the third heavy fraction from the third light fraction by means of gravity.

24. The separation system of claim 23, wherein the second separator section comprises an oil/water chamber which is configured to receive the second heavy fraction from the first separator section and separate the first proportion of the third heavy fraction from the third light fraction by means of gravity.

25. The separation system of claim 24, wherein the oil/water chamber comprises means for coalescing at least one of droplets of the oil fraction in the second heavy fraction and droplets of the water fraction in the second heavy fraction.

26. The separation system of claim 25, wherein the oil/water chamber comprises a number of perforated distribution baffles positioned upstream of the coalescing means.

27. The separation system of claim 24, wherein the second separator section comprises an oil chamber which located downstream of the oil/water chamber and is configured to receive the third light fraction from the oil/water chamber.

* * * * *